United States Patent
Springer

(10) Patent No.: US 6,276,016 B1
(45) Date of Patent: Aug. 21, 2001

(54) SAFETY LEG SYSTEM FOR DOCK LEVELER

(75) Inventor: Scott L. Springer, Whitewater, WI (US)

(73) Assignee: Rite-Hite Holding Corporation, Milwaukee, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/842,541

(22) Filed: Apr. 15, 1997

(51) Int. Cl.[7] ....................................... E01D 1/00
(52) U.S. Cl. ............................. 14/71.1; 14/69.5; 14/71.3
(58) Field of Search ................................ 14/69.5, 71.1, 14/71.3, 71.5, 71.7

(56) References Cited

U.S. PATENT DOCUMENTS

| | | | |
|---|---|---|---|
| 3,728,753 | 4/1973 | Beckwith et al. | |
| 3,786,530 * | 1/1974 | Le Clear | 14/71.3 |
| 3,877,102 * | 4/1975 | Artzberger | 14/71.3 |
| 3,921,241 * | 11/1975 | Smith | 14/71.3 X |
| 3,995,342 * | 12/1976 | Wiener | 14/71.3 |
| 4,279,050 * | 7/1981 | Abbott | 14/71.3 |
| 4,325,155 * | 4/1982 | Alten | 14/71.1 |
| 4,619,008 * | 10/1986 | Kovach et al. | 14/71.7 |
| 4,662,021 * | 5/1987 | Hagen et al. | 14/71.3 |
| 5,311,628 * | 5/1994 | Springer et al. | 14/71.3 X |
| 5,416,941 * | 5/1995 | Hageman | 14/71.7 |
| 5,440,772 * | 8/1995 | Springer et al. | 14/69.5 |

* cited by examiner

*Primary Examiner*—William Neuder
*Assistant Examiner*—Sunil Singh
(74) *Attorney, Agent, or Firm*—Marshall, O'Toole, Gerstein, Murray & Borun

(57) ABSTRACT

A dock leveler including a deck pivotally mounted relative to a loading dock, and a lip pivotally connected to the deck at the front end for pivotal movement between a pendant position and an extended position wherein the lip may engage the vehicle, at least one leg member pivotally connected to the front end of the deck for movement between a supporting position and a nonsupporting position, and a leg control member pivotally attached to the front end of the deck and adapted to engage the bed of the vehicle along with the lip, and to maintain the leg member in a nonsupporting position so long as the leg control member is carried on the bed of the vehicle, the leg control member losing contact with a departing vehicle before the lip loses contact with the vehicle, allowing the leg member to return to a supporting position, such that downward movement of the deck will be arrested in the event the vehicle continues departing and the lip loses contact with the bed of the vehicle with a load present on the deck.

17 Claims, 8 Drawing Sheets

SAFETY LEG SYSTEM FOR DOCK LEVELER

FIELD OF THE INVENTION

The invention is directed generally to dock levelers, and more particularly to a dock leveler exhibiting enhanced protection against uncontrolled free fall.

BACKGROUND OF THE INVENTION

Dock levelers are commonly used at loading docks for the purpose of bridging the gap between a vehicle parked adjacent the loading dock and the loading dock itself. Typically, the vehicle will back up into a parked position wherein the rear of the vehicle engages bumpers disposed on the face of the building and intended to protect both the building and the rear of the vehicle from impact or defacement. With the vehicle backed against the bumpers, a gap still exists between the loading dock and the truck. The dock leveler is intended to bridge this gap.

Typically, the loading dock will be formed with a pit within which framing for the dock leveler is housed. The leveler itself comprises a deck pivotally attached at its rear end relative to the loading dock, usually to the framing. The deck is movable between a stored or "cross-traffic" position wherein the deck is even with the warehouse or building floor on either side of the pit, and a range of operating positions to accommodate various vehicle elevations. The stored position is referred to as a "cross-traffic" position since traffic moving in the warehouse can move over the deck easily as it forms an extension of the surrounding floor. At the front end of the deck, adjacent the parked truck, is a lip pivotally connected to the front end of the deck for movement between a pendant, or stored position and an extended position wherein the lip bridges the gap between the deck and the bed of the parked vehicle. With the leveler in this bridging configuration, fork trucks or personnel can pass between the loading dock and the bed of the parked vehicle for the purpose of loading and unloading the vehicle. As the vehicle is loaded or unloaded, and as the fork truck passes on and off of the vehicle, differing weights are exerted on the vehicle's suspension. As a result, the vehicle will typically move up and down throughout the loading or unloading procedure. The pivotal connection of the deck of the dock leveler allows the leveler to track this up and down movement of the vehicle.

In operation, the deck is first raised from the cross-traffic position (with the lip pendant) to a raised preparatory position. The power to raise the deck is provided either by springs (in the case of a so-called "mechanical leveler") or by a hydraulic cylinder or other actuator disposed between the framing and the deck. In a mechanical leveler a "holddown" device normally holds the leveler down against the upward bias of the springs. The holddown may be released to raise the deck by pulling the unit's main pull chain. Once the deck reaches the preparatory position, the lip is extended from its pendant position to an extended position. Subsequent downward rotation of the deck places the lip on the bed of the vehicle so as to bridge the gap between the dock and the vehicle. In a hydraulically-powered leveler, or one powered up by a different actuator, gravity provides the force necessary to rotate the leveler downward, while a mechanical leveler requires the weight of dock personnel to "walk down" the leveler to a position wherein the lip rests on the bed of the vehicle. As the vehicle moves up and down during loading or unloading, the leveler pivots up and down to maintain proper contact with the vehicle.

Since dock levelers are capable of pivoting in this manner, they preferably also include some means for preventing uncontrolled free fall of the deck in the event that the vehicle departs while a fork truck or other load is still disposed on the deck. Departure of the vehicle with a load still on the deck is typically referred to as "premature" or "unscheduled" since proper safety procedures require that the deck be unloaded before a vehicle departs. If premature departure were to occur without any means of free fall protection, such premature departure of the vehicle would mean that the lip was no longer in contact with the vehicle, and thus that the heavily loaded deck was effectively unsupported, and it would thus pivot downwardly through its full range of motion until it engaged the pit below. Given that a typical operating range for dock levelers is from 10 inches above dock height to 10 inches below dock height, it would be possible for a fork truck disposed on the leveler in such a situation to fall as much as 20 inches. The violent contact between the falling deck and the pit, as well as the substantial pitch at which the deck would then be disposed, could lead to undesirable results, such as the fork truck falling off the deck or goods or personnel being damaged or injured.

Different types of levelers may include different types of free fall protection intended to minimize the distance through which the deck may free fall before such downward movement is arrested. In the case of hydraulic levelers, the deck is powered through its range of motion by means of a hydraulic cylinder disposed between the underside of the deck and the pit below. To protect against free fall, the hydraulic cylinder typically includes a velocity fuse. The velocity fuse is intended to lock the hydraulic cylinder against further movement in the event that the deck achieves a certain velocity. Accordingly, if free fall begins to occur and the deck reaches this velocity, the hydraulic cylinder will be locked, and prevent the deck from further downward movement. Mechanical and other types of levelers, on the other hand, typically include so-called safety legs to limit free fall distance. An example of one type of safety leg mechanism is shown in the prior art FIGS. 2 and 3. The safety leg SL depends from the bottom of the deck and is adapted to engage a pedestal P disposed in the pit. Contact between the end of the leg SL and the pedestal P will arrest downward movement of the deck indicated as D. Thus, if a vehicle prematurely departs with a load on the deck, the deck will only "free fall" a limited distance—until the legs SL engage pedestal P. The legs SL typically remain in a supporting orientation for this purpose. For situations where the bed of the truck is significantly lower than dock height, the legs may be retracted rearwardly by a retracting mechanism R to allow the deck to angle downwardly below dock without the safety leg engaging the first stop S1 on the pedestal. To protect against free fall with the deck in a below-dock configuration, a second stop S2 is provided on the pedestal. The safety leg L is biased by a biasing member B, in this case a spring, toward the vertical position shown in FIG. 2. Accordingly, if the leveler is initially disposed below dock with the legs retracted and then is raised above dock by virtue of weight being removed from the truck and the vehicle suspension raising the leveler, the safety leg SL will return to the vertical orientation shown in FIG. 2.

While the safety leg configuration, and other similar safety leg configurations, provide the advantageous function of preventing substantial free fall in the event of premature or unscheduled departure of the vehicle with a load on the deck, they are not without their own limitations. One such limitation to previous safety leg configurations is shown if FIG. 3. In the circumstance shown in FIG. 3, the leveler is in a position wherein the safety leg SL engages the stop S1 on the pedestal P, thus preventing further downward movement of the leveler. As the fork truck moved onto the vehicle bed, however, the weight of the fork truck pushed the vehicle down further. The lip L was able to track this downward movement of the vehicle, since engagement of the safety leg SL with the stop S1 does not limit rotational movement of the lip L. The deck D, however, was prevented from moving to a lower position. The steep angle of the lip L may prevent the fork truck from being able to drive back up that slope and onto the deck D, or may at least cause a jarring collision between the lip and the fork truck. In the former circumstance, the fork truck may get trapped on the vehicle. This condition, typically referred to in the industry as "stump out" is an inconvenience, and represents a potential safety hazard to the fork truck operator who does not notice the significant angle of the lip. In addition, damage to either the lip, the leveler or the fork truck may occur as the fork truck attempts to drive back up the inclined lip. As the function of safety legs is otherwise very desirable, it would be advantageous to be able to provide a safety leg system that does not suffer from the disadvantages of stump out.

At least two attempts have been made in the prior art to address this issue. Both U.S. Pat. Nos. 3,995,342 and 5,440,772 include sensors that engage the bed of the vehicle along with the lip. In both cases, the sensor is shorter than the lip such that, in the event the vehicle prematurely departs, the sensor loses contact with the bed of the vehicle before the lip loses contact with the vehicle. When the sensor is in contact with the vehicle, the safety legs are retracted such that they are in a nonsupporting position. Upon the sensor losing contact with the bed of the vehicle, the safety legs are restored to a supporting position such that they would arrest downward movement of the leveler. Thus, when the vehicle departs, the sensor first loses contact with the vehicle moving the legs to a supporting position, and then the lip loses contact with the vehicle. This loss of contact between the lip and vehicle, however, does not result in substantial or uncontrolled free fall, since the legs have been restored to a supporting position. While these systems theoretically address the stump out problem, neither system proved to be workable in practice. For example, the system of the '342 patent includes a feature wherein the lip is latched into its extended position, and only could be unlatched by contact with the vehicle bed. Such a feature is problematic and potentially dangerous in the situation where the deck is raised and the lip is latched out, and then the deck is walked down without ever engaging a vehicle. As a result, the latched-out lip presents an obstacle and potential point of damage for a vehicle that backs into the loading dock while it is still latched in position. Another danger is that, in this scenario, if a fork truck were to drive onto a leveler with a latched-out lip, the leveler would rapidly rotate downward since the safety legs would not be in a supporting position. Moreover, both of these prior art systems included several pivot points, for the lip, the sensor, and the legs, and fairly complex mechanisms between these three members for the purpose of providing the desired safety leg function without stump out. The tolerances required to achieve proper functionality were difficult to achieve, leading to inconsistent function, as well as difficulty in manufacturability of these systems. The complex nature of the actuating mechanisms also led to increased expense for these systems.

SUMMARY OF THE INVENTION

It is therefore the primary aim of the present invention to provide a safety leg system for a dock leveler that avoids the drawbacks associated with previous such systems.

In accordance with the aim, it is a primary object of the invention to provide a safety leg system that minimizes uncontrolled free fall of a dock leveler in the event of premature vehicle departure, but that also avoids the problem of stump out.

A further object is to provide a dock leveler with a safety leg assembly that is simple to implement and reliable and repeatable in operation.

A related object is to provide dock leveler with a safety leg assembly that has enhanced manufacturability as compared to previous systems.

In accordance with these and other object of the invention, there is provided a dock leveler comprising the conventional features of a deck having a front end and rear end pivotally mounted relative to a loading dock to provide movement of the deck between the stored position and a range of operative positions, and a lip pivotally connected to the deck at the front end for pivotal movement between a pendant position and an extended position wherein the lip may engage the vehicle. The dock leveler also includes at least one leg member or safety leg pivotally connected to the front end of the deck, preferably about the same pivot as the lip. The leg is pivotal between a supporting position, wherein the leg is disposed to arrest downward movement of the deck, such as by engaging a stop, and a nonsupporting position. In a preferred embodiment of the invention, the mounting of the leg member at or adjacent to the front end of the deck allows the leg member to be pivoted forward (i.e., the free end of the leg moving away from the rear end of the deck) as it moves to the nonsupporting position. The leveler also includes a leg control member or sensor member, also pivotally attached adjacent or at the front end of the deck, and also preferably pivoted about the same hinge as the lip and the leg member. Further, the leg control member or sensor preferably forms a part of the lip itself. The sensor is adapted to engage the bed of the vehicle along with the lip, and to maintain the leg member in a nonsupporting position, so long as the sensor is carried on the bed of the vehicle. The sensor is also adapted to lose contact with a departing vehicle before the lip loses contact with the vehicle. This loss of contact between the sensor and the vehicle bed allows the leg member to return to a supporting position, such that downward movement of the deck will be arrested in the event the vehicle continues departing and the lip loses contact with the bed of the vehicle with a load present on the deck.

According to one embodiment of the invention, the sensor is carried by the lip, such that movement of the lip from a pendant to a extended position moves the sensor between its pendant position and a first position. In this embodiment, that first position is an extended position, but wherein the sensor is disposed below the lip, such that the sensor will contact the bed of the vehicle before the lip does, as the leveler is pivoted downward. The connection between the lip and the sensor is a lost motion connection such that contact of the bed by the sensor moves the sensor relative to the lip until the sensor and lip are essentially coplanar and resting on the bed of the truck. Movement of the sensor from its first position to this second position retracts the legs to the nonsupporting position by means of a connection between the legs and the sensor member. As the vehicle departs, the sensor member will lose contact with the bed of the vehicle before the lip loses contact with the bed of the vehicle. The lost motion connection between the lip and the sensor allows the sensor to move from the second position back to the first position, thus restoring the leg member to a supporting position such that, for subsequent disengagement between the lip and vehicle bed, the leg will be in a supporting, deck-arresting position.

BRIEF DESCRIPTION OF THE DRAWINGS

FIG. 11 an alternative embodiment of the invention, showing a modified pedestal;

DESCRIPTION OF THE PREFERRED EMBODIMENTS

Figure 1:
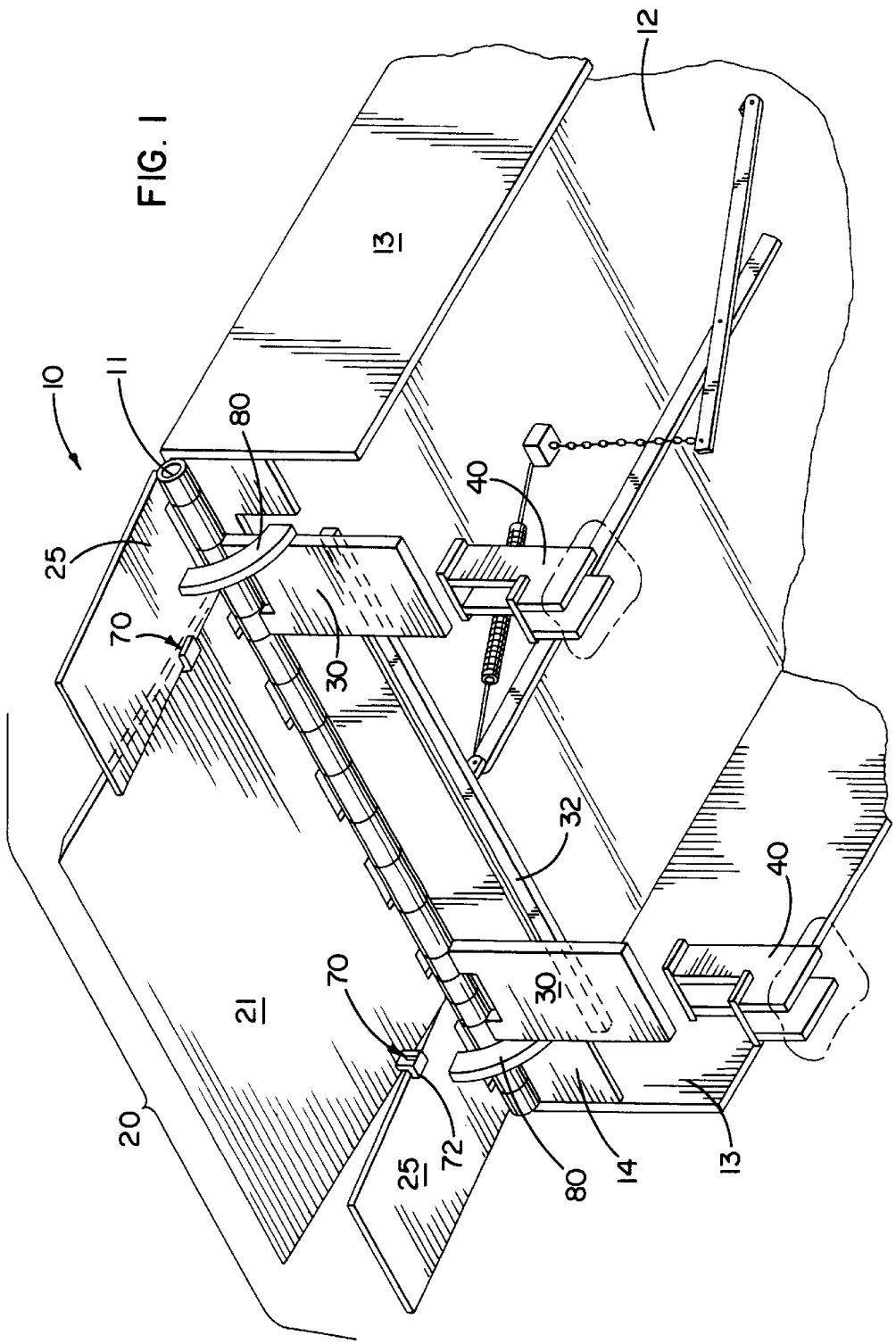
FIG. 1 is a perspective view of a dock leveler including a safety leg assembly according to one embodiment of the present invention.
Figure 2:
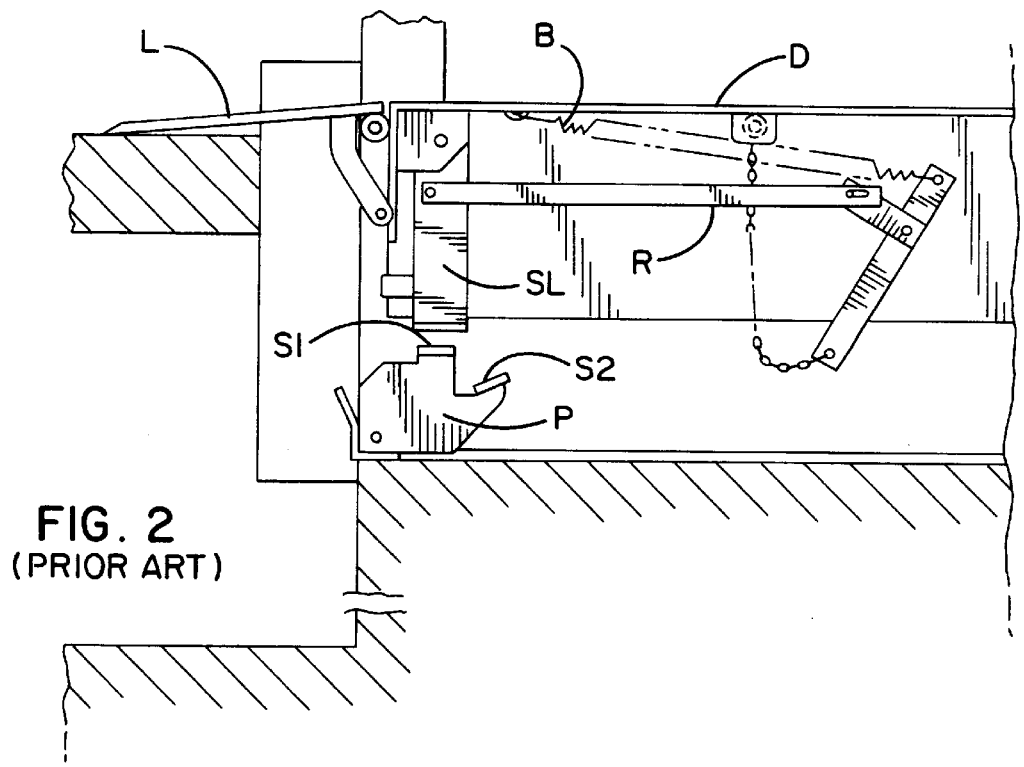
FIGS. 2 and 3 are prior art drawings showing dock levelers with safety leg assemblies that exhibit stump out.
Figure 3:
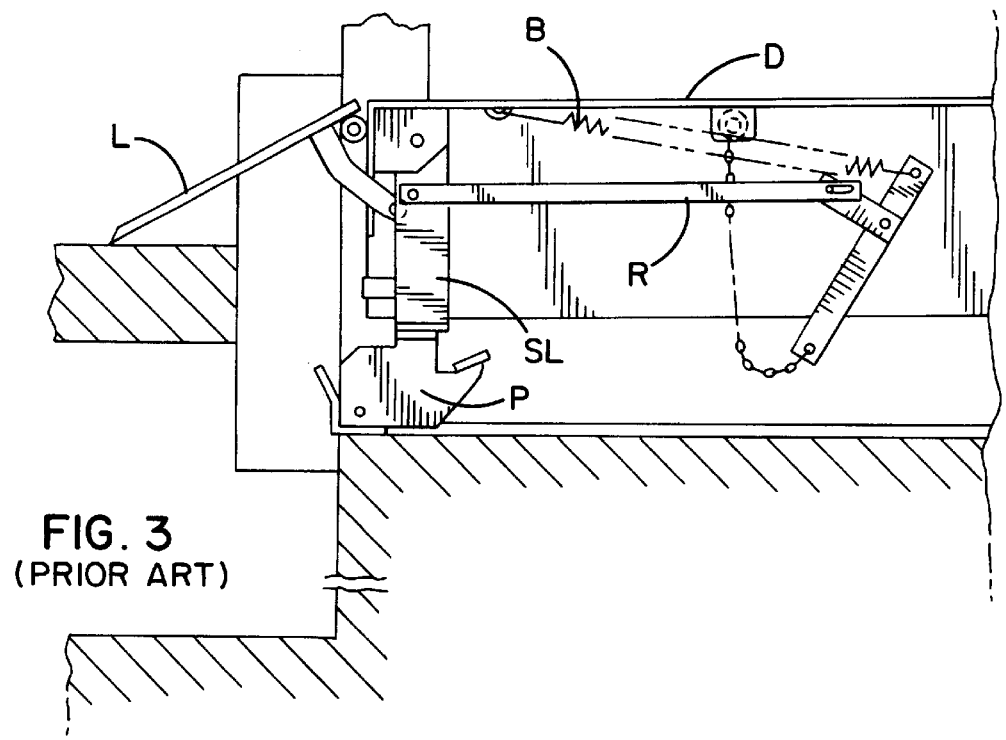

A dock leveler according to a first embodiment of the invention is seen in perspective view in FIG. 1. As in conventional dock levelers, the leveler 10 according to the invention includes a deck 12 that is pivotally connected relative to a loading dock. In this embodiment, the leveler deck 12 is pivotally connected at its rear end (not shown) to framing members (not shown) typically disposed in a pit P formed at the loading dock with which the leveler is associated (the pit P can be seen in the side elevational drawings of FIGS. 4–8). This allows the deck to pivot between a cross-traffic position (FIG. 4) and a range of operative positions (FIGS. 5–8) including a preparatory position (FIG. 5) at which the deck is pivoted upward to its greatest extent.

The deck can be moved through its various positions by means of a variety of actuators such as those described in the background section (i.e., springs, hydraulic cylinder, or other actuators). A specific example of actuation can be found in U.S. Pat. No. 5,440,772 the teachings of which are expressly incorporated herein by reference. The deck 12 may be reinforced and supported by side members 13, and by a header member 14 disposed between the side members adjacent the front end of the deck 12. A lip 21 is pivotally attached adjacent the front end of the deck 12 about hinge 11. At least one leg control member or sensor 25 (this embodiment shows two sensors 25) is disposed laterally of the lip 21, and is disposed for pivotal movement on the same hinge 11 as the lip 21. The sensor 25 is preferably shorter in length than the lip 21, as will be described in greater detail below. It forms an aspect of the invention that both the lip 21 and the sensor or sensors 25 are pivotally connected about a common hinge 11. Further, as sensors 25 are disposed laterally of lip 21, and as they are disposed about a common hinge, sensors 25 and lip 21 may be considered as individual pieces of a single lip structure 20 that includes a main section (lip 21) and a sensor section or sections (sensor or sensors 25).

Figure 4:
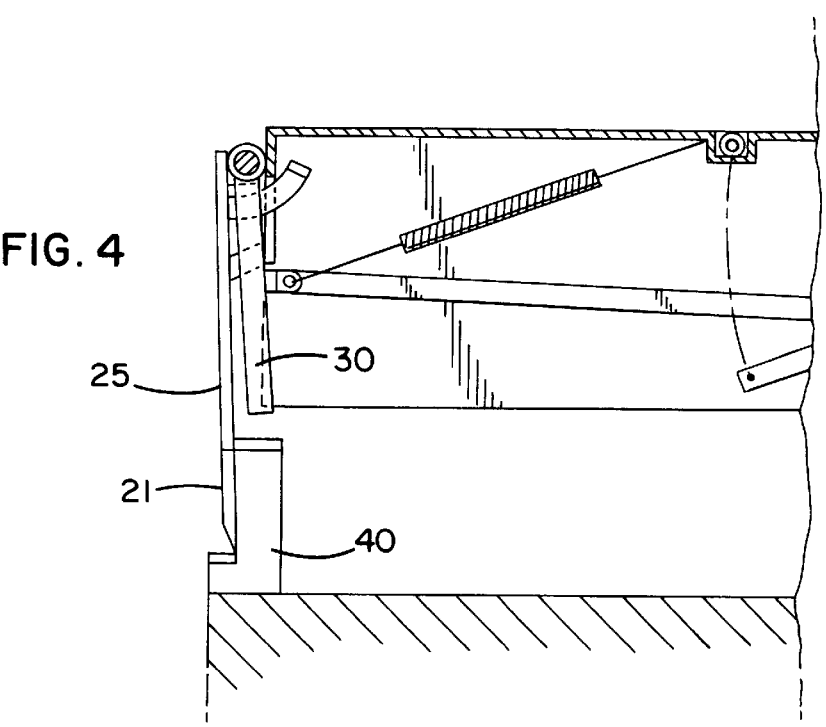
FIGS. 4–8 are a series of operational section views of the dock leveler according to the invention and shown in FIG. 1.
Figure 5:
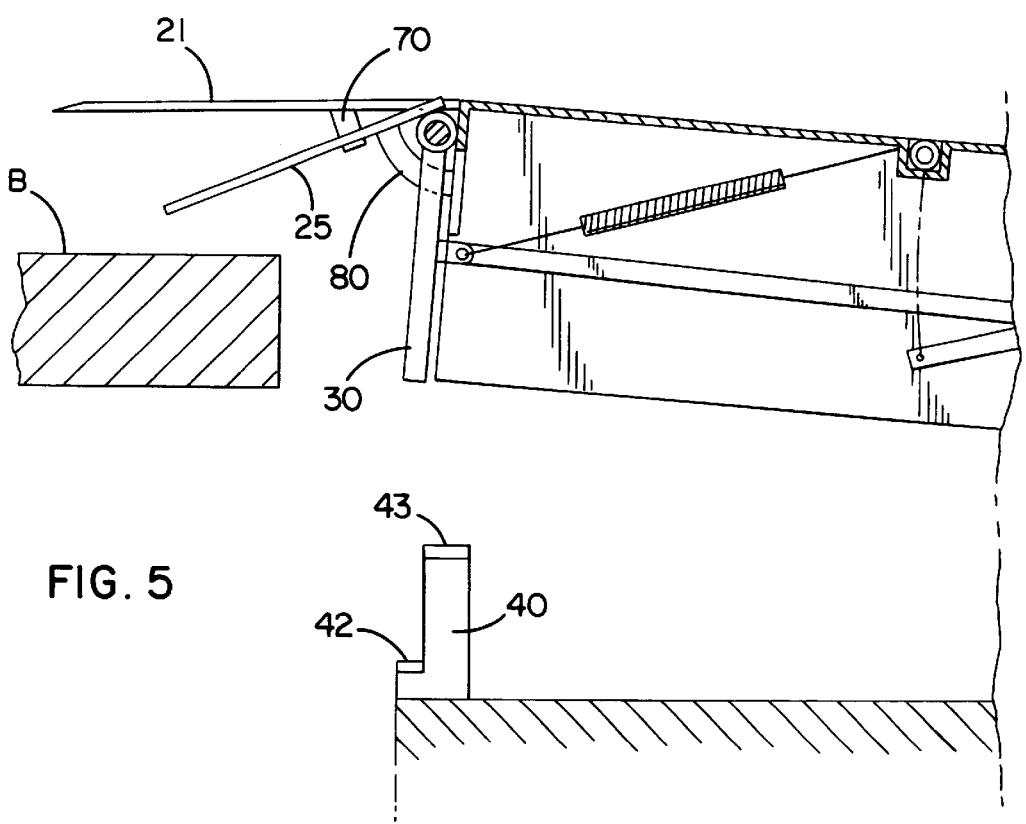
Figure 6:
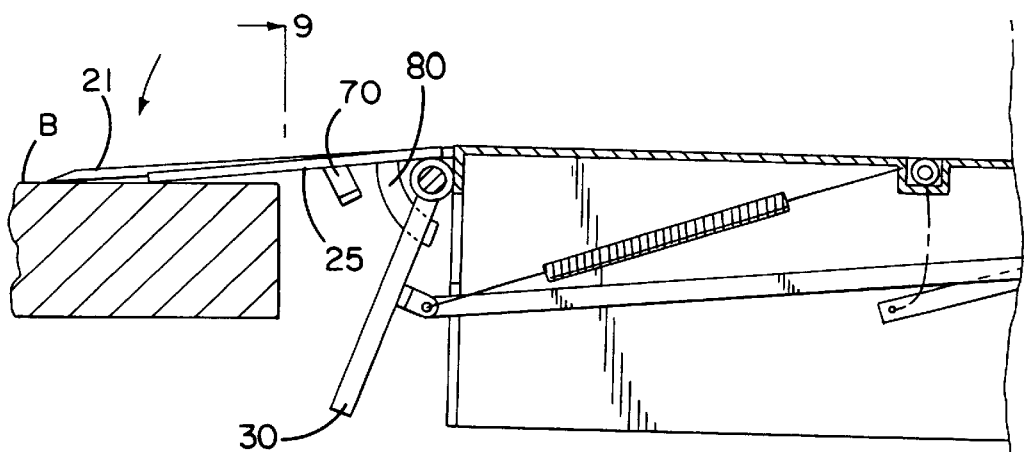

To support the deck 12 in a cross-traffic position, and/or to arrest downward movement of the deck in a free-fall situation, at least one leg member 30 is included. In the present embodiment, a pair of leg members 30 are joined by a connecting strut 32. In turn, each of the leg members (or "safety legs") 30 is pivotally attached adjacent the front end of the deck 12. In the present embodiment, the legs 30 are pivotally attached to the same hinge 11 as the lip 21 and leg control member or sensor 25. Alternatively, leg or legs 30 could be disposed elsewhere adjacent the front end of the deck 20, such as below the hinge 11 on a separate hinge 33 shown in FIGS. 15 and 16, to be discussed in greater detail below. The pivotal mounting of the legs 30 allows them to pivot between a supporting position, such as is shown in FIGS. 4 and 5, and a non-supporting position as shown in FIG. 6. In a supporting position, leg 30 is disposed such that it will engage a stop member or pedestal 40 disposed within the pit P as the deck pivots downward due to downward forces exerted on the deck 12. Pedestal 40, in the present embodiment, includes more than one support surface 42 for receiving the leg 30 when in a supporting position. Accordingly, the supporting "position" may actually be a range of positions. Similarly, the leg 30 may also pivot to a non-supporting position, such as that shown in FIG. 6. In the non-supporting position (or within the range of non-supporting positions), the leg 30 is disposed to not engage the pedestal 40 to arrest downward movement of the deck. The non-supporting positions of the leg 30 are often referred to as "retracted" positions. With the leg or legs 30 in this retracted or non-supporting position, free fall of the deck 12 would not be prevented in the event of unscheduled or unintended departure of the vehicle being loaded or unloaded with a forklift or other load present on the deck 12. However, the ability to move the leg 30 to a retracted position allows the problem of stump out, described above, to be avoided during the normal loading and unloading operation, i.e., with the vehicle parked, and lip 21 engaging the bed B of the vehicle.

Figure 7:
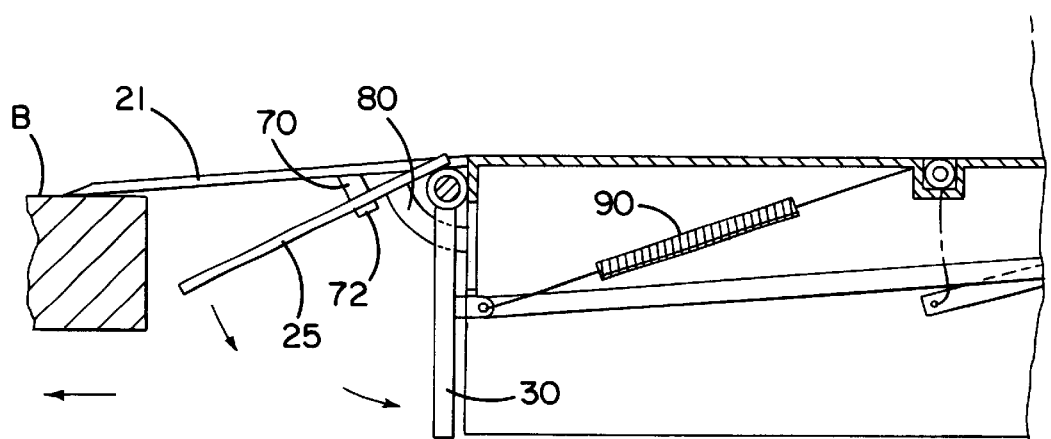
Figure 8:
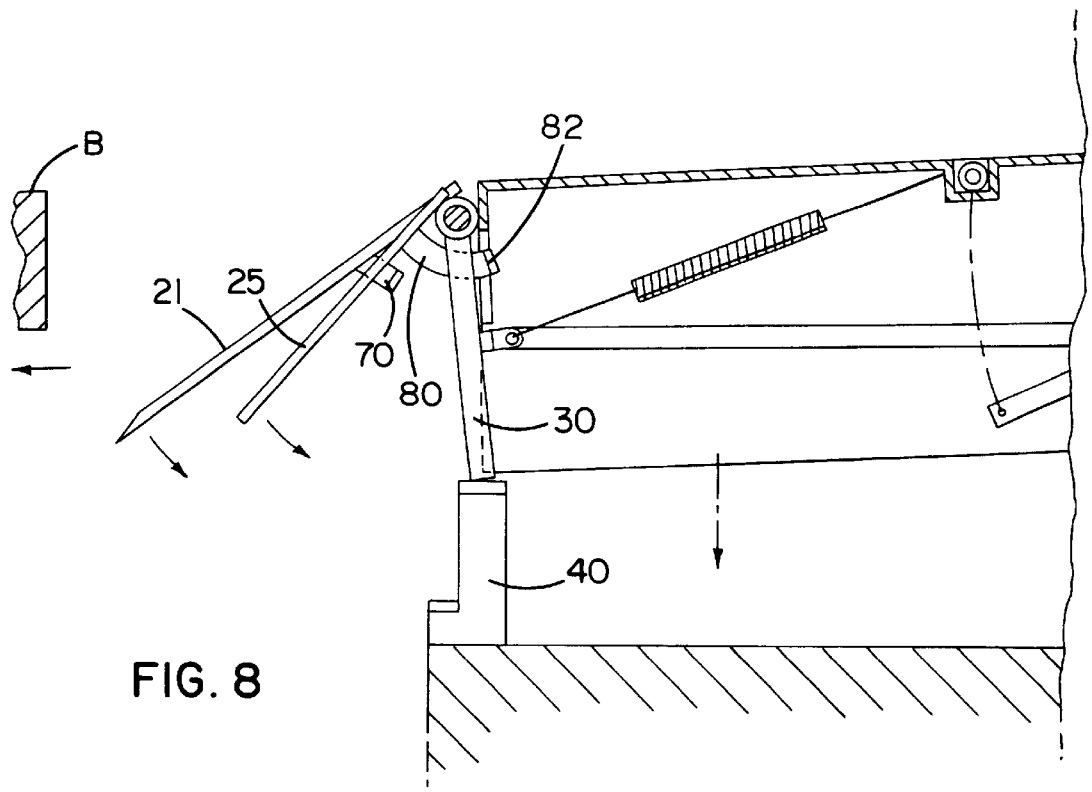

As it is thus desirable to be able to retract the leg 30 to prevent stump-out during normal operation and to still have the leg 30 in a supporting position to prevent an uncontrolled free-fall situation, the dock leveler according to the present embodiment provides both of these functions. The lip 21 and sensor 25 are interconnected with the leg 30 in a manner to provide both for retraction of the leg 30 during normal operation of the leveler, and for movement of the leg 30 to a supporting position before the vehicle departs, to prevent uncontrolled free fall. This structure and advantageous function will be described in reference to FIGS. 4–8, representing an operational sequence of dock leveler operation. FIG. 4 shows the dock leveler 10 in a stored, cross-traffic position. In FIG. 5, the deck 12 has been raised to a preparatory position, causing the lip 21 and sensor 25 to be extended. In FIG. 6, the deck 12 has been lowered, such that the lip 21 and sensor 25 engage the bed B of the parked vehicle to provide the normal loading and unloading operation. FIG. 7 represents a departure situation, with the bed B of the vehicle moving away from the loading dock. FIG. 8 shows the vehicle bed B fully departed such that the lip 21 completely loses contact with the vehicle.

In the present embodiment, the coupling between the lip 21 and the sensor 25 is in the form of a bracket member 70 disposed at a lateral edge of the lip 21 (two such members are shown in FIG. 1 as it includes two sensors 25). The bracket 70 has a general L-shape including a lug 72 that engages the underside of the sensor 25. Accordingly, the bracket 70 allows the lip 21 to "carry" the sensor 25. That is, as the lip 21 moves between its pendant position (FIG. 4) and an extended position (FIG. 5), the sensor 25 is moved between its pendant position (FIG. 4) and a first position (FIG. 5) disposed beneath the lip 21. With the lip 21 thus extended and the sensor 25 in the first, or preparatory position, the deck is now ready to be lowered onto the bed B of the vehicle. As the deck is lowered, the lip 21 engages the bed. In this embodiment, the sensor 25 first engages the bed B of the vehicle. Because of the lost motion nature of the coupling between the lip 21 and the sensor 25, the sensor is allowed to move relative to the lip 21 to a second position, shown in FIG. 6, wherein the sensor 25 is substantially flush with the lip 21, and wherein both the sensor 25 and the lip are resting on the bed B of the vehicle.

The coupling between the sensor 25 and the leg member 30 is similar in this embodiment, as it is in the form of a bracket member 80 including a lug 82 that engages the back side of the leg member 30. The spacing of the lug 82 from the sensor 25 is such that the sensor moves from its pendant position (FIG. 4) to the first position (FIG. 5) without moving or retracting the leg 30. Thus, with the lip 21 extended and the sensor 25 in the first position (FIG. 5), the leg 30 remains in a supporting position. As the sensor 25 engages the bed B of the vehicle and rotates to the second position (FIG. 6), the leg member 30 is moved by the bracket 80 to a nonsupporting or retracted position. Thus, with the lip 21 and sensor 25 disposed on the bed B of the vehicle, the leg member is in a retracted position, allowing the deck 12 to move up and down with the bed B of the vehicle through the full operating range of the leveler without stump-out occurring. Since the sensor 25 in the present embodiment controls whether the leg member 30 is in a supporting or nonsupporting position, it may also be referred to herein as a leg control member.

At the same time, the structure of and the couplings between the lip 21, sensor 25 and leg member 30 also provide for free-fall protection in the event of premature vehicle departure with a load present on dock 12. With the sensor 25 on the bed B of the vehicle, the sensor 25 is spaced from the lug 72 of the bracket 70, but the leg member 30 is adjacent to or contacting the lug 82 of the bracket 80. Upon departure of the vehicle being serviced, and because the length of the sensor 25 is shorter than the length of the lip 21, the sensor 25 will lose contact with the vehicle before the lip 21 loses contact with the vehicle (FIG. 7). When this occurs, the sensor 25 moves relative to the lip 21 and back to the first position, until it engages the lug 72. As the sensor 25 moves back to the first position, the leg member 30 is returned to a supporting position. While the nature of the couplings between the lip 21, the sensor 25 and the leg member 30 are such that gravity will return the legs to a supporting position once the sensor 25 loses contact with the bed B, a biasing member such as spring 90 may be employed to bias the leg member 30 toward a supporting position. The spring 90 will decrease the time required to return the leg 30 a to a supporting position, as compared to relying on gravity alone for this function. Thus, as can be seen in FIG. 7, the leg member has been returned to a supporting position prior to the lip 21 losing contact with the bed B of the vehicle. FIG. 8 then shows the vehicle fully departed, and the lip 21 losing contact with the bed B.

The dock leveler according to this embodiment of the invention thus provides for normal operation without stump-out, since the leg member 30 is held in a retracted or non-supporting position so long as the sensor 25 remains on the vehicle. Upon departure of the vehicle, but prior to the lip 21 losing contact with the vehicle, the leg member 30 is returned to a supporting position. If a load is then present on the deck when a vehicle is fully departed (lip 21 loses any contact with the vehicle), the leg member 30 will be in a supporting position to prevent uncontrolled free fall. The dock leveler according to the invention provides this advantageous function by providing the lip 21 and the leg member or members 30 on a common hinge 11. Since the various components controlling the leg member 30, as well as the leg member 30 itself, do not have to be mounted on their own pivot axes (as in prior attempts to provide similar function), the reliability and manufacturability of this design is improved. Further, the function is also provided by preferably making the sensor 25 a part of a lip structure 20, as opposed to being a separate and separately-mounted member. Further still, the mounting of the leg member 30 adjacent the front end of the deck (in this case on the hinge 11) allows the leg member 30 to be rotated forward when moving from a supporting to a non-supporting or retracted position. This allows a smaller necessary range of movement for the leg member 30, since it must only be moved far enough forward to avoid contact with the pedestal 40. In designs where the legs were retracted "back," they not only had to clear a pedestal, but had to be retracted far enough back and up so as to not contact the pit or leveler framing when the deck was in a below-dock position.

Figure 10:
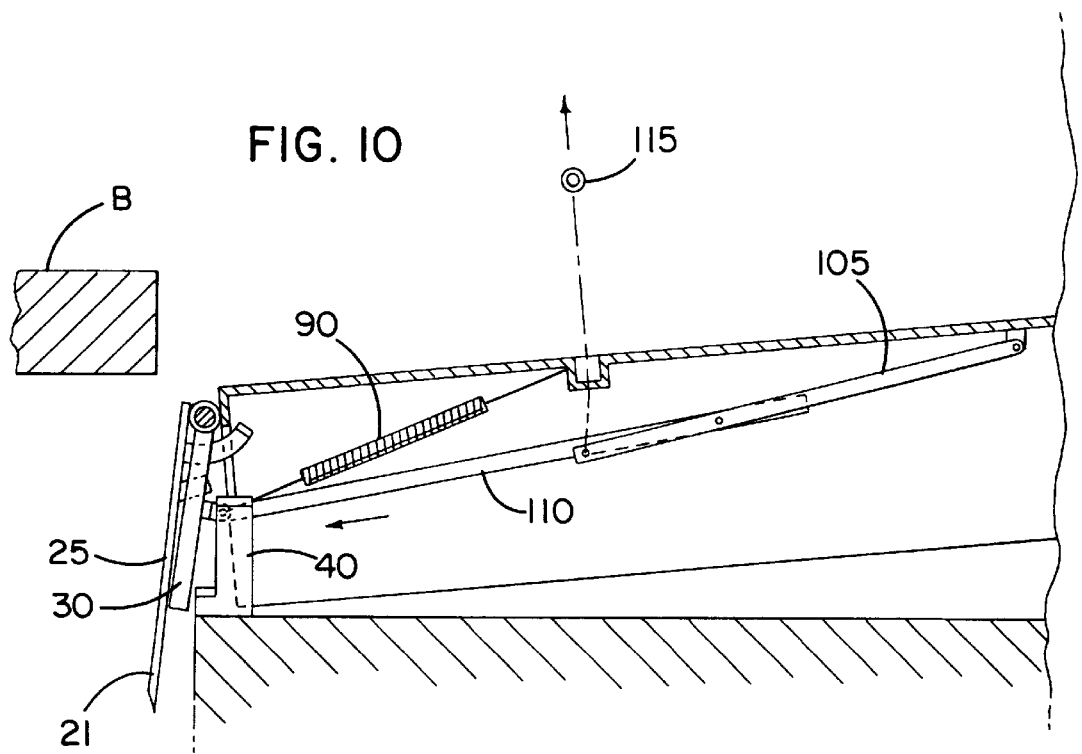
Figure 9:
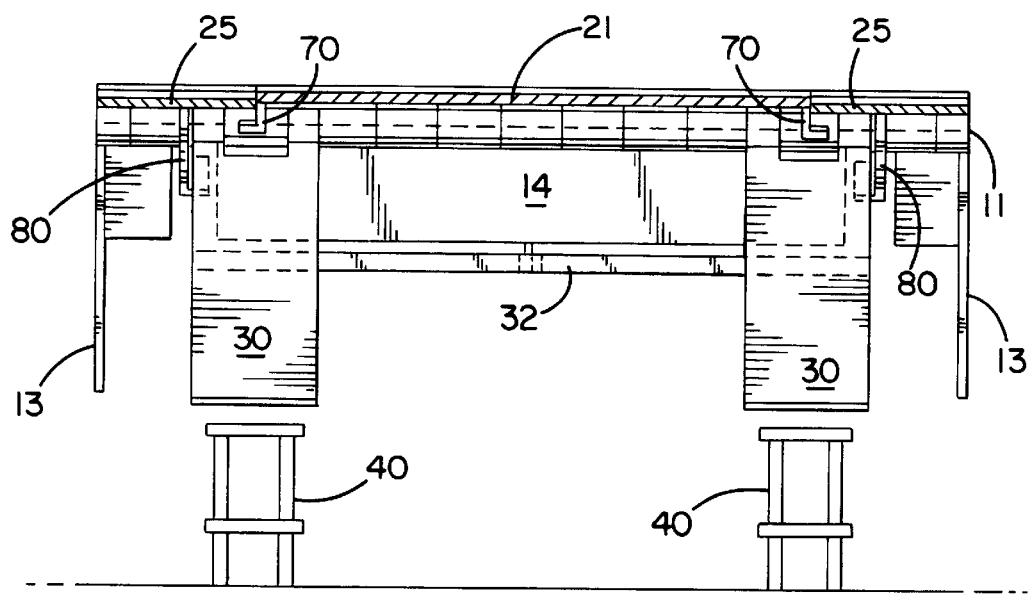
FIG. 9 is a front elevation of a dock leveler according to the invention, shown in the operational configuration of FIG. 6.

The dock leveler according to the invention also includes structure for providing for below-dock end load. A below-dock end load is a loading or unloading situation wherein cargo is being loaded or unloaded from the extreme rear end of the vehicle bed. As a result, there is no available bed upon which to place to lip of the dock leveler. Accordingly, the leveler is used as a ramp without the lip extended, with the fork truck or other material handling vehicle simply driving to the end of the deck and "picking" the end load (or placing it in the case of loading) from the bed of the vehicle. Performing an end load above dock height does not present particular problems. However, a below-dock end load with a dock leveler including safety legs requires that the legs be retracted to allow the deck to go below-dock without the legs engaging the stops or pedestals. In the present embodiment, a retracting mechanism 100 is provided to perform this function. A bar linkage 100 comprising first (105) and second (110) links is connected between the deck and the leg member 30. As seen most clearly in FIG. 1, in this case the bar linkage is connected to the strut 32 connecting the two leg members 30. The linkage is actuated by a pull-chain 115. As the chain is pulled upwards by an operator standing on the deck 12, the linkage toggles, exerting an outward force on the leg member 30 tending to rotate it forward. This rotational force on the leg member 30 causes the leg member 30 to push on the lip 21, also rotating it and sensor 25 outward. With the leg member 30 retracted in this manner, a below-dock end load can be performed. Operationally, the dock leveler would start in the cross-traffic position of FIG. 4. The main pull chain would be pulled briefly to release the holddown and allow the deck to raise slightly, such that the lip 21 is not contacting the pedestal 40, but not far enough up such that the lip 21 is extended. The operator then walks forward on the deck 12, pulling pull-chain 115 to retract the legs. As he walks further out on the deck 12, it rotates downward to a below-dock position shown in FIG. 10. The end load can now be performed. Once the chain 115 is released, the leg member 30 will tend to rotate back to a supporting position, either by gravity, or under the effect of the biasing member 90. Of course, it will be appreciated by one of skill in the art that the same linkage 100 may be used to retract legs 30 to allow normal (i.e. non-end-load) servicing of vehicles initially disposed below dock height.

Figure 11:
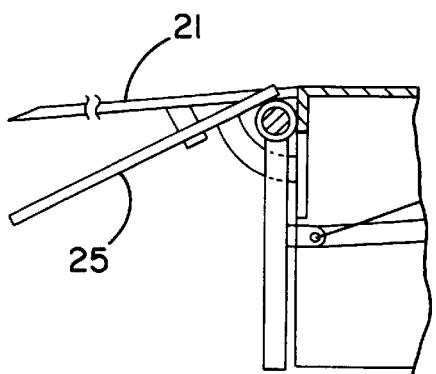
FIG. 11 is the dock leveler of FIG. 1, shown in a side section, and showing a below dock end load configuration.
Figure 12:
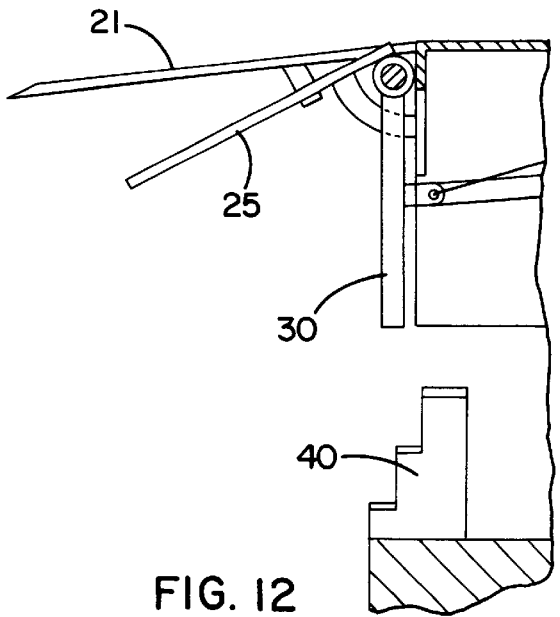
FIG. 12 is a further alternative embodiment of the invention, showing a modified pedestal.

It will be noted that the pedestal 40 shown in FIGS. 4–8 includes a plurality of stops, in this case first stop 42 and second stop 43. Multiple stops are included so that, for a free-fall situation, a stop will be disposed within a small distance from the end of the leg member 30 so that the maximum distance of the free fall will be limited. The larger the number of stops, the smaller the maximum distance of free fall. For example, instead of the two steps shown in FIGS. 4–8, three stops could be used, as shown in FIG. 12. As will be appreciated by one of skill in the art, geometries and spacing may limit the number of stops that may practically be included on the pedestal. Further, the pedestal 40 may be provided with a lipkeeper 130 as in FIG. 11. The lip 21 is disposed behind the lipkeeper 130 when the dock leveler 10 is in the stored, or cross-traffic position. The lipkeeper 130 prevents the lip from being pulled out with the leveler in a cross-traffic position, which could represent a security issue, since an intruder could lower the leveler with the lip extended and enter the building through the gap between the building door and the deck. It should also be noted that although the dock leveler is shown in FIG. 4 as resting on the lip 21 in the cross-traffic position, the leg member 30 could alternatively be engaged on the pedestal 40 to support the weight of the deck in this position.

Figure 13:
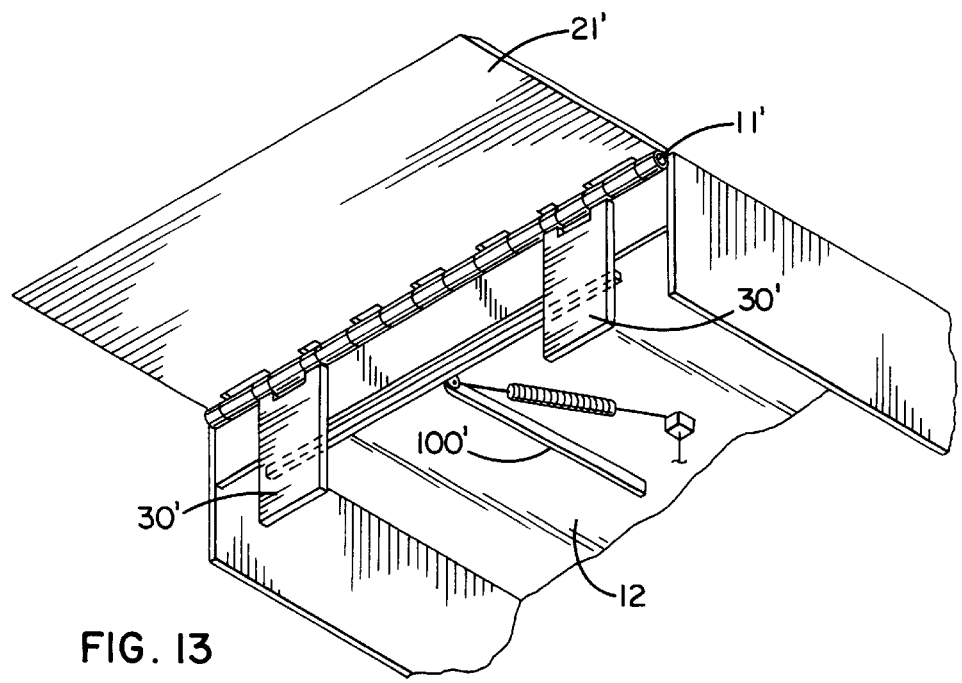
FIG. 13 is a perspective view of a dock leveler according to an alternative embodiment of the invention.
Figure 14:
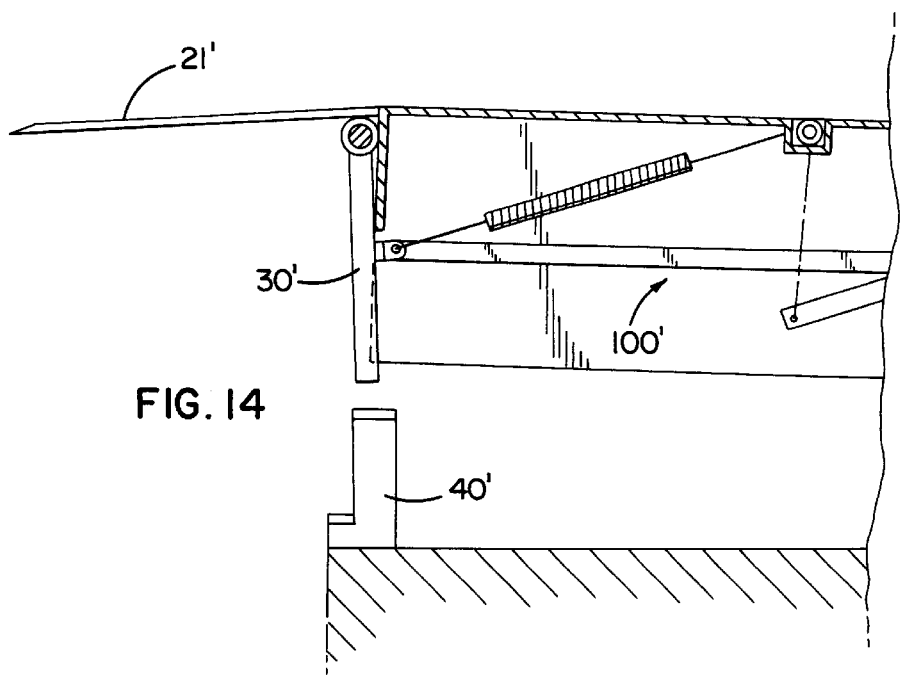
FIG. 14 is a side section of the leveler of FIG. 13.
Figure 15:
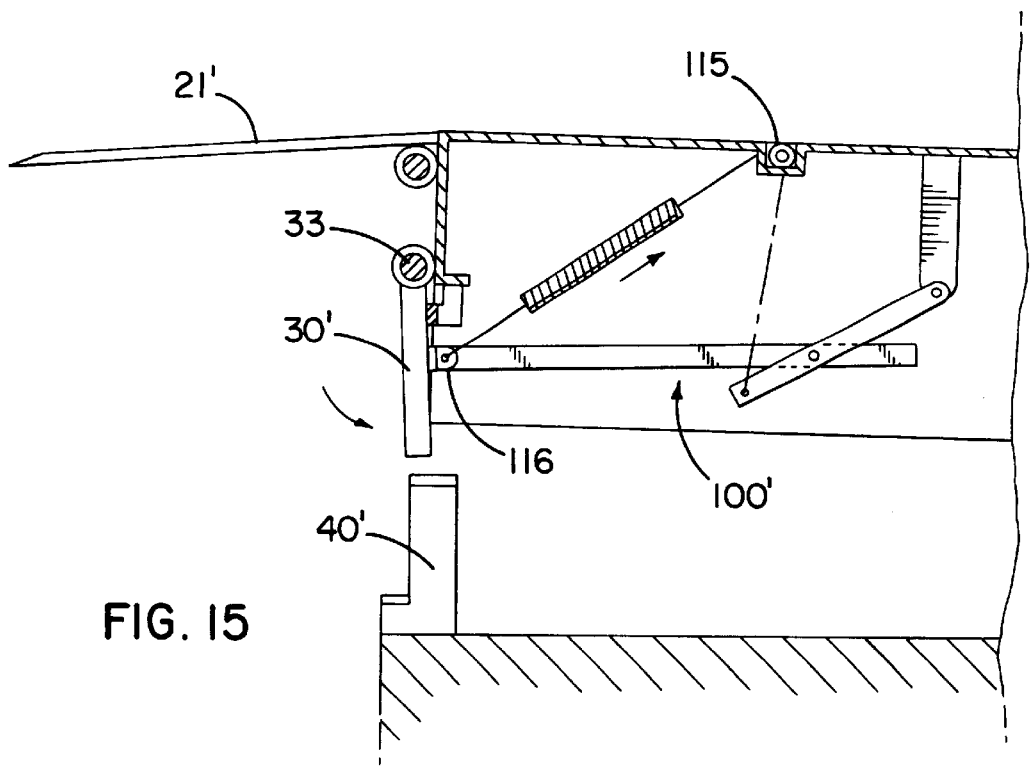
FIG. 15 is a side section view of a dock leveler according to an alternative embodiment of the invention.
Figure 16:
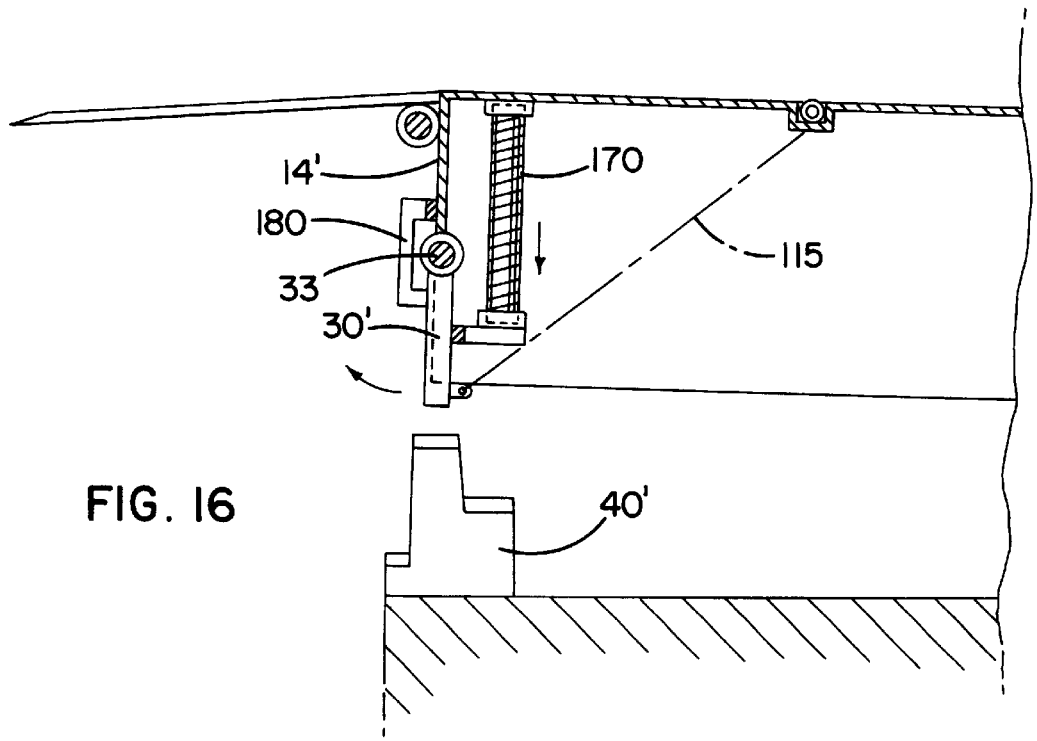
FIG. 16 is a side section view of a dock leveler according to a further alternative embodiment of the invention.

FIGS. 13–16 show alternative embodiments of the invention. Since components are similar to the embodiment shown in FIGS. 4–12, the same reference numbers with a prime (') designation will be used. These embodiments do not include members for sensing the departure of the vehicle, nor for retracting the leg member for normal operation. They do show, however, the advantageous feature of disposing the leg member adjacent the front end of the deck 12, illustratively either on the same hinge 11' as the lip 21' (FIGS. 13 and 14), or disposed at the front end of the deck 12, but on a separate hinge 33 disposed beneath the lip hinge 11'. The structure and operation of the leg member 30' in FIGS. 13 and 14 is the same as that in FIGS. 4–8, but without the ability to retract the leg member 30' for normal operation without stump-out. A bar linkage 100' is provided to retract the leg member 30' for below-dock service. The leg member 30' shown in FIG. 15 is also similar in operation, but disposed on a hinge 33 beneath the main hinge 11'. The leg member 30' of FIG. 16 is slightly different in that it is intended to be retracted rearwardly for a below-dock end load. Toward that end, pull-chain 115' is connected directly to the leg member 30' at a lug 116. A compression spring 170 is shown disposed between the leg member 30' and the header 14' tends to rotate the leg member 30' back to a supporting position once the chain 115' is released. A stop member 180 is also disposed on the header 14' to limit the forward rotation of the leg member 30', and maintain it in a supporting position.

There has thus been disclosed a dock leveler including a safety leg assembly that prevents stump out from occurring, while providing protection against uncontrolled free fall. While embodiments of the invention have been disclosed herein, such embodiments are not intended to be limiting of the scope of the claimed invention. Rather, the invention claimed encompasses all improvements, modifications, or equivalents to these embodiments, or components thereof, as may fall within the scope of the following claims.

What is claimed is:

1. A dock leveler assembly for loading and unloading a vehicle parked adjacent a loading dock, comprising:

a deck having a front end and a rear end, the rear end being pivotally mounted relative to the loading dock to provide pivotal movement of the deck between a stored position, and a range of operative positions;

a hinge adjacent the front end of the deck;

a lip pivotally connected to the deck at the hinge for pivoting between a pednant position and an extended position wherein the lip may engage the vehicle;

a leg member pivotally connected to the deck on the same hinge as the lip, and movable between a supporting position wherein the leg member is disposed to arrest downward movement of the deck, and a nonsupporting position.

2. The dock leveler assembly of claim 1, wherein a stop member is disposed beneath the deck, and wherein the leg member includes a proximal end pivotally mounted to the deck, and a distal end that engages the stop member to arrest downward movement of the deck with the leg member in the supporting position, and wherein the distal end moves away from the rear end of the deck as the leg member pivots to the nonsupporting position.

3. The dock leveler of claim 2, wherein the stop member includes a plurality of stops disposed at different vertical positions.

4. The dock leveler assembly of claim 1, and including: a leg control member pivotally connected to the deck at the hinge; and a coupling between the leg control member and the leg member such that the position of the leg control member relative to the deck controls movement of the leg member between supporting and nonsupporting positions.

5. The dock leveler assembly of claim 4, and including a coupling between the lip and the leg control member, the coupling disposed to engage the leg control member and move the leg control member to a first position relative to the lip as the lip moves to the extended position, and to allow the leg control member to move to a second position relative to the lip as the leg control member and the lip engage the bed of a parked vehicle.

6. The dock leveler assembly of claim 5, wherein the leg control member is disposed and dimensioned to lose contact with the bed of a vehicle departing from the loading dock before the lip loses contact with the bed of the departing vehicle, the coupling between the lip and the leg control member being disposed to allow the leg control member to pivot from the second position to the first position as it loses contact with the bed of the departing vehicle.

7. The dock leveler assembly of claim 6, wherein the coupling between the leg control member and the leg member provides movement of the leg member from the supporting to the nonsupporting position as the leg control member moves from the first position to the second position; and vice versa.

8. The dock leveler of claim 1, and including a pair of leg members pivotally connected to the deck at the hinge and connected together by a strut member.

9. A dock leveler assembly for loading and unloading a vehicle parked adjacent a loading dock, comprising:

a deck having a front end and a rear end, the rear end being pivotally mounted relative to the loading dock to provide pivotal movement of the deck between a stored position, a preparatory position, and a range of operative positions;

a lip pivotally connected adjacent the front end of the deck for pivoting between a pendant position and an extended position as the deck reaches the preparatory position, the lip being disposed to engage the vehicle in the extended position;

a leg member pivotally connected adjacent the front end of the deck, and movable between a supporting position wherein the leg member is disposed to arrest downward movement of the deck, and a nonsupporting position, the leg member including a distal end and a proximal end, and disposed such that the distal end moves away from the rear end of the deck as the leg member pivots to the nonsupporting position;

a leg control member pivotally connected adjacent the front end of the deck, and coupled to the leg member such that the position of the leg control member relative to the deck controls movement of the leg member between supporting and nonsupporting positions; and wherein the lip, leg control member, and leg member are pivotally attached to a common hinge on the front end of the deck.

10. The dock leveler assembly of claim 9, wherein the leg control member is coupled to the lip such that movement of the lip to an extended position moves the leg control member to a first position relative to the lip, and wherein the leg control member moves to a second position relative to the lip as the deck pivots downward from the preparatory position and the leg control member engages the vehicle.

11. The dock leveler assembly of claim 10, wherein the leg member is coupled to the leg control member such that movement of the leg control member from the first position to the second position moves the leg member from the supporting position to the nonsupporting position, and vice versa.

12. The dock leveler assembly of claim 11, wherein the leg control member is dimensioned to lose contact with a vehicle departing from the loading dock before the lip loses contact with the vehicle, the leg control member moving from the second position to the first position upon losing contact with the vehicle.

13. A dock leveler assembly for loading and unloading a vehicle parked adjacent a loading dock, comprising:

a deck having a front end and a rear end, the rear end being pivotally mounted relative to the loading dock to provide pivotal movement of the deck between a stored position and a range of operative positions;

a lip pivotally connected to the deck adjacent the front end, the lip including a main section that pivots between a pendant position and an extended position wherein the main section may engage the vehicle, and a sensor section that pivots between a pendant position, a first position wherein the sensor section may engage the vehicle, and a second position between the first position and the pendant position;

a leg member pivotally connected to the deck adjacent the front end, and movable between a supporting position wherein the leg member is disposed to arrest downward movement of the deck, and a nonsupporting position in response to movement of the sensor section of the lip from the first position to the second position, the sensor section having a length shorter than the main section of the lip such that the sensor section disengages from the vehicle before the main section loses contact with the vehicle as the vehicle moves away from the loading dock, such disengagement allowing the leg member to return to a supporting position before the main section loses contact with the vehicle;

wherein the main section, the sensor section and the leg member are pivoted on a common hinge on the front end of the deck.

14. A dock leveler assembly for loading and unloading a vehicle parked adjacent a loading dock, comprising:

a deck having a front end and a rear end pivotally mounted relative to the loading dock to provide pivotal movement of the deck between a stored position and a range of operative positions;

a header member attached across the front end of the deck;

a lip pivotally connected to the deck forward of the header member for pivoting between a pendant position and an extended position wherein the lip may engage the vehicle;

a leg member pivotally connected to the deck at least as forward as the header member, and movable between a supporting position wherein the leg member is disposed to arrest downward movement of the deck, and a nonsupporting position, the leg member including a distal end, and disposed such that the distal end moves away from the rear end of the deck as the leg member pivots to the nonsupporting position.

15. A safety leg assembly for a dock leveler for loading and unloading a vehicle parked adjacent a loading dock, the dock leveler including a deck having a front end and a rear end pivotally mounted relative to the loading dock to provide pivotal movement of the deck between a stored position and a range of operative positions, and a lip pivotally connected to the deck adjacent the front end for pivoting between a pendant position and an extended position wherein the lip may engage the vehicle, the safety leg assembly comprising:

a leg control member adapted to be pivotally connected to the deck adjacent the front end for pivoting between a pendant position, a first position wherein the leg control member may engage the vehicle, and a second position between the first position and pendant position;

a leg member adapted to be pivotally connected to the deck adjacent the front end, and movable between a supporting position wherein the leg member is disposed to arrest downward movement of the deck, and a nonsupporting position in response to movement of the leg control member from the first position to the second position, and vice versa;

the leg control member having a length shorter than the lip such that the leg control member disengages from the vehicle before the lip loses contact with the vehicle as the vehicle moves away from the loading dock, such disengagement allowing the leg member to return to the supporting position before the lip loses contact with the vehicle;

wherein the leg control member and the leg member are adapted to be pivoted on a common hinge with the lip on the front end of the deck.

16. The safety leg assembly of claim 15, wherein the leg control member is adapted to be coupled to the lip, such that movement of the lip from the pendant to the extended position moves the leg control member from the pendant to the first position.

17. A safety leg assembly for a dock leveler for loading and unloading a vehicle parked adjacent a loading dock, the dock leveler including a deck having a front end and a header member extending across the front end and a rear end pivotally mounted relative to the loading dock to provide pivotal movement of the deck between a stored position and a range of operative positions, and a lip pivotally connected to the deck adjacent the front end for pivoting in a first direction between a pendant position and an extended position wherein the lip may engage the vehicle, the safety leg assembly comprising:

a leg member adapted to be pivotally connected to the deck at least as forward as the header member and including a distal end, and adapted to move such that the distal end moves in the first direction as the leg member moves between a supporting position wherein the leg member is disposed to arrest downward movement of the deck, and a nonsupporting position, said movement in the first direction being adapted to be responsive to movement of the lip from the pendant position to an extended position.

* * * * *